United States Patent

Matsuoka

[11] Patent Number: 5,852,652
[45] Date of Patent: Dec. 22, 1998

[54] VOICE MAIL EXCHANGE WITH A MESSAGE RECORDER DIVIDED INTO SECTORS FOR GROUPS OF VOICE MAIL TELEPHONE SETS

[75] Inventor: Shin-Ichi Matsuoka, Tokyo, Japan

[73] Assignee: NEC Corporation, Tokyo, Japan

[21] Appl. No.: 607,460

[22] Filed: Feb. 27, 1996

[30] Foreign Application Priority Data

Feb. 28, 1995 [JP] Japan .................................. 7-040036

[51] Int. Cl.$^6$ ................................................ H04M 1/64
[52] U.S. Cl. .............................. 379/88; 379/68; 379/83; 379/88.04; 379/88.18; 379/88.22; 379/88.27
[58] Field of Search ........................... 379/67, 88, 89, 379/67.1, 68, 83, 88.01, 88.04, 88.18, 88.22, 88.27

[56] References Cited

U.S. PATENT DOCUMENTS

| 4,371,752 | 2/1983 | Matthews et al. | 379/89 |
| 5,117,451 | 5/1992 | Ladd et al. | 379/67 |
| 5,268,957 | 12/1993 | Albrecht | 379/67 |
| 5,384,381 | 1/1995 | Cresswell et al. | 379/67 |
| 5,483,578 | 1/1996 | Ackermann et al. | 379/67 |

FOREIGN PATENT DOCUMENTS 114742 3/1989 Japan .

*Primary Examiner*—Fan S. Tsang
*Assistant Examiner*—Allan Hoosain
*Attorney, Agent, or Firm*—Sughrue, Mion, Zinn, Macpeak & Seas, PLLC

[57] ABSTRACT

In a voice mail exchange for voice mail telephone sets grouped into first through N-th groups, where N represents a first predetermined number, a message recorder comprises memory sectors in one-to-one correspondence to the first through N-th groups for storage of messages originating at and destined to the telephone sets. The voice mail exchange may also include interface circuits which are selectively put in operation by control signals produced in accordance with predetermined office data by a control unit. The interface circuits interface between first through N-th recorder signals supplied to (and reproduced from) the memory sectors and first through M-th switchboard signals produced by (and supplied to) a switchboard connected to the telephone sets, where M represents a second predetermined number related to N by the office data.

11 Claims, 3 Drawing Sheets

VOICE MAIL EXCHANGE WITH A MESSAGE RECORDER DIVIDED INTO SECTORS FOR GROUPS OF VOICE MAIL TELEPHONE SETS

BACKGROUND OF THE INVENTION

This invention relates to a voice mail exchange for a plurality of voice mail telephone sets which are typically used in various departments or sections of an enterprise.

Exchanges of this kind are already known. For example, an automatic response device for a plurality of push-button or multifrequency dialling telephone sets is disclosed in Japanese Patent Publication (B2) No. 14,742 of 1989. The automatic response device is a private branch exchange and comprises a voice recorder and a switching unit or switchboard. Arriving at the switchboard either from one of the push-button telephone sets or from an external telephone set of a public telephone network as an incoming signal, a message is stored in the voice recorder as a stored message for reproduction by a called set of the push-button telephone sets. Alternatively, the stored message is transferred by the switching unit to another of the push-button telephone sets. As a further alternative, the stored message is transmitted by the switching unit to an external telephone set as an outgoing signal. It may therefore appear that a calling party can always convey a message to a called party.

If such an absent message is already stored in the voice recorder, the switching unit connects the calling party to the called party. If the absent message is not yet stored, the voice recorder is used. The voice recorder stores a single absent message only once for each of the push-button telephone devices. In the patent publication cited above, it is not described to make the voice recorder keep records of a plurality of messages for each of the push-button telephone sets. The automatic response device is consequently incapable of dealing with a voice service or application where recorded messages are transmitted between the push-button telephone sets and/or between the push-button telephone sets and external telephone sets.

Such voice telephone sets are typically used in a plurality of departments or sections of an enterprise. Frequencies of occurrence of calls or traffic may be different from department to department. When the voice recorder is used by a particular department more frequently than other departments, these other departments can not sufficiently enjoy the voice service. Moreover, the voice recorder has a limited memory area or capacity. The particular department therefore almost solely uses the voice recorder. The automatic response device accordingly becomes busy for the other departments although not used in fact by any one of the other departments.

SUMMARY OF THE INVENTION

It is consequently a principal object of the present invention to provide a voice mail exchange for a plurality of voice mail telephone sets, which exchange is capable of serving for a voice mail application even though an appreciable unbalance is present between frequencies of use of the voice mail telephone sets per unit time, such as a business hour.

It is another principal object of this invention to provide a voice mail exchange which is of the type described and in which a message recorder of a limited memory capacity will not be overloaded even when the message recorder is much frequently used by particular ones of the voice mail telephone sets.

It is a subordinate object of this invention to provide a voice mail exchange which is of the type described and in which a plurality of transmission ports of a switchboard unit will not be busy for particular ones of the voice mail telephone sets.

Other objects of this invention will become clear as the description proceeds.

In accordance with this invention, there is provided a voice mail exchange for a total plurality of voice mail telephone sets grouped into first through N-th groups, where N represents a predetermined number, an n-th group of the first through the N-th groups consisting of the telephone sets, an n-th plurality in number, where n is variable between 1 and N, both inclusive, and where a summation of n is equal to the total plurality. The voice mail exchange comprises a message recorder for recording messages and switching means for switching transmission of the messages between the message recorder and the telephone sets of the first through the N-th groups, wherein (a) the message recorder comprises first through N-th memory sectors in one-to-one correspondence to the first through the N-th groups so that an n-th memory sector of the first through the N-th memory sectors is used for the message originating at and destined to the telephone sets of the n-th group, (b) the switching means judging, when the n-th memory sector should be used for storage of one of the messages that is for one of the telephone sets of the n-th group, whether or not the n-th memory sector includes an idle portion for storage of that one of messages.

DESCRIPTION OF THE PREFERRED EMBODIMENTS

Figure 1:
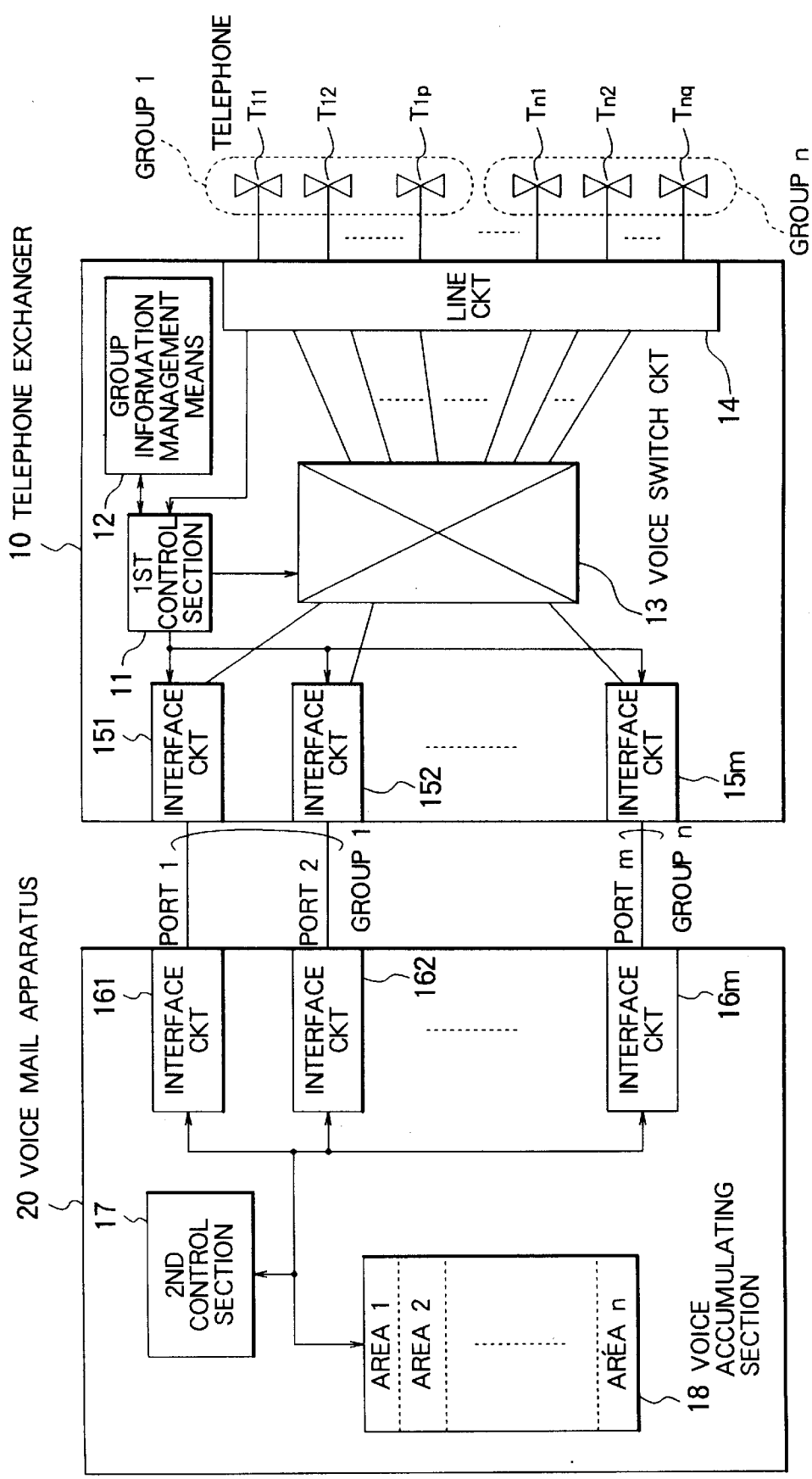
FIG. 1 is a functional block diagram of a voice mail exchange according to a first embodiment of this invention.
Figure 2:
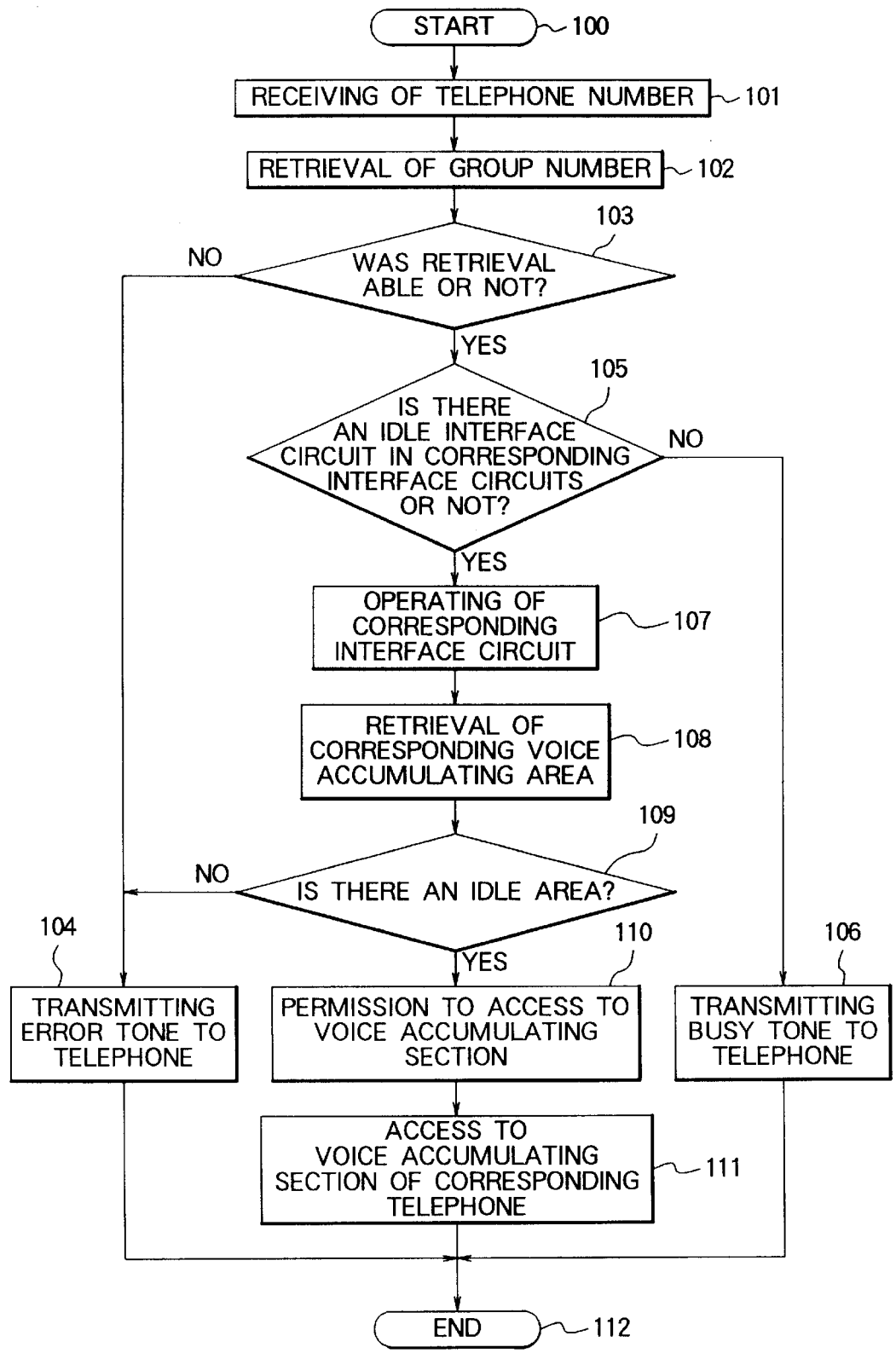
FIG. 2 is a flow chart for use in describing operation of the voice mail exchange illustrated in FIG. 1.

Referring now to FIGS. 1 and 2, the description will proceed to a system for divisional using telephone groups of a single voice mail apparatus according to a first preferred embodiment of this invention.

The first embodiment of this invention comprises a telephone exchanger 10 and a voice mail apparatus 20. The telephone exchanger 10 and the voice mail apparatus 20 are connected by ports 1–m through interface circuits 151–15m, 161–16m. The telephone exchanger 10 comprises a first control section 11 controlling the telephone exchanger 10 wholly, a group information management means 12 for managing telephone groups 1–n, a voice switch circuit 13 for switching between plural telephones and the voice mail apparatus 20 under control of the first control section 11, and a line circuit 14 accommodating the plural telephones. The plural telephone or housephone sets are divided into n groups. Telephones T11–T1P belong to group 1, and telephones Tn1–Tnq belong to group n. The voice mail apparatus 20 comprises a second control section 17 controlling the voice mail apparatus 20, and a voice accumulating section 18 which is divided into areas 1–n in correspondence to the telephone groups 1–n. Ports 1–m, which connect between the telephone exchanger 10 and the voice mail apparatus 20, are predetermined to be used by which of the telephone group 1–n on a basis of office data of the telephone exchanger 10. It will be presumed that the office data of the telephone exchanger 10 assign the port 1 between the interface circuits 151, 161 and the port 2 between the interface circuits 152, 162 to the telephone group 1, and the port m between the interface circuits 15m, 16m to the telephone group n.

Next, the description will proceed to actual operation of the first embodiment of this invention. Merely for brevity of the description, the description will be related to a case where the telephone T11 of the telephone group 1 gets access to the voice mail apparatus 20. Information of a dial signal from the telephone T11 is transmitted to the line circuit 14. The line circuit 14 analyzes the dial signal information, and recognizes that it is access to the voice mail apparatus 20. The line circuit 14 transmits a signal of demand for connecting to the voice mail apparatus 20 from the telephone T11 to the first control section 11. The first control section 11 refers to a table of the group information management means 12. In the group information management means 12, the table is stored in a memory circuit, such as an RAM. The first control section 11 recognizes that the telephone T11 belongs to the telephone group 1. The first control section 11 controls the voice switch circuit 13 on a basis of the information of the telephone group 1. Meanwhile, the first control section 11 always manages a state of the interface circuits 151–15m. In this case, the first control section 11 selects an idle one of the interface circuits 151 and 152. When both the interface circuits 151 and 152 are busy, the first control section 11 returns a busy tone to the telephone T11 through the voice switch circuit 13. Even if both the interface circuits 151 and 152 are busy and some one of the other interface circuits 153–15m is idle, the first control section 11 returns the busy tone to the telephone T11. Consequently, access to ports to the voice mail apparatus 20 for other telephone groups is protected.

Let us suppose that the interface circuit 151 is idle. Instructed by the first control section 11, the interface circuit 151 transmits a call from the telephone T11 to the interface circuit 161 of the voice mail apparatus 20. The interface circuit 161 transmits a signal of demand for access to the voice mail apparatus 20 from the telephone T11 to the second control section 17.

The voice accumulating section 18 accumulates and reproduces a voice file. The voice accumulating section 18 is beforehand divided into plural areas in correspondence to the telephone groups by system data of the voice mail apparatus 20.

The second control section 17 accumulates a voice from the telephone T11 in an idle territory of the area 1 which is allocated to the telephone group 1 in the voice accumulating section 18 using information from the interface circuit 161. Depending on the circumstances, the second control section 17 reads an accumulated voice file at the area 1, and makes the telephone T11 reproduce.

When the second control section 17 judges that there is no idle territory in the area 1, the second control section 17 transmits information of no idle territory to the first control section 11 by way of the interface circuits 161 and 151. In this case, the first control section 11 returns an error tone to the telephone T11 through the voice switch circuit 13 if a voice accumulation is newly demanded from the telephone T11. Even if there is an idle area in the accumulating area which is designated to other telephone groups in the voice accumulating section 18, access to that idle area is not permitted. The first control section 11 returns the error tone to the telephone T11. Consequently, the voice accumulating areas for these other telephone groups are protected.

The above is described about the telephone T11 as an example. Needless to say, actual operation of any one of the telephones is similar to the above.

FIG. 2 is a flow chart illustrative of operation of the voice mail exchange according to the first embodiment of this invention. FIG. 2 will be referred to in addition to FIG. 1. When operation is started (100) by a telephone, the first control section 11 receives (101) the calling telephone number, and retrieves (102, 103) the corresponding group number by the information management means 12 of the telephone groups. In case the retrieval is impossible, the first control section 11 returns (104) an error tone to the calling telephone. In case the retrieval is possible, the first control section 11 investigates (105) whether or not there is an idle interface circuit or not in those interface circuits of the voice mail apparatus 20 which are predetermined for the corresponding telephone group. In case there is not an idle interface circuit in the interface circuits 161–16m, the first control section 11 returns (106) a busy tone to the calling telephone. In case there is an idle interface circuit in the interface circuits, the first control section 11 operates (107) this idle interface circuit. The second control section 17 can get the group number of the calling telephone through the interface circuit. The second control section 17 retrieves (108, 109) in the voice accumulating section 18 an idle area which is predetermined for the corresponding group. In case there is not an idle area, the second control section 17 returns (104) an error tone to the calling telephone. In case there is an idle area, the second control section 17 permits (110) access to the voice accumulating section 18. The calling telephone is now operable (111) to accumulate newly a voice file in the voice accumulating area which is designated to the calling telephone's group, and to read the existing voice file. A sequence of processing comes to an end (112).

Figure 3:
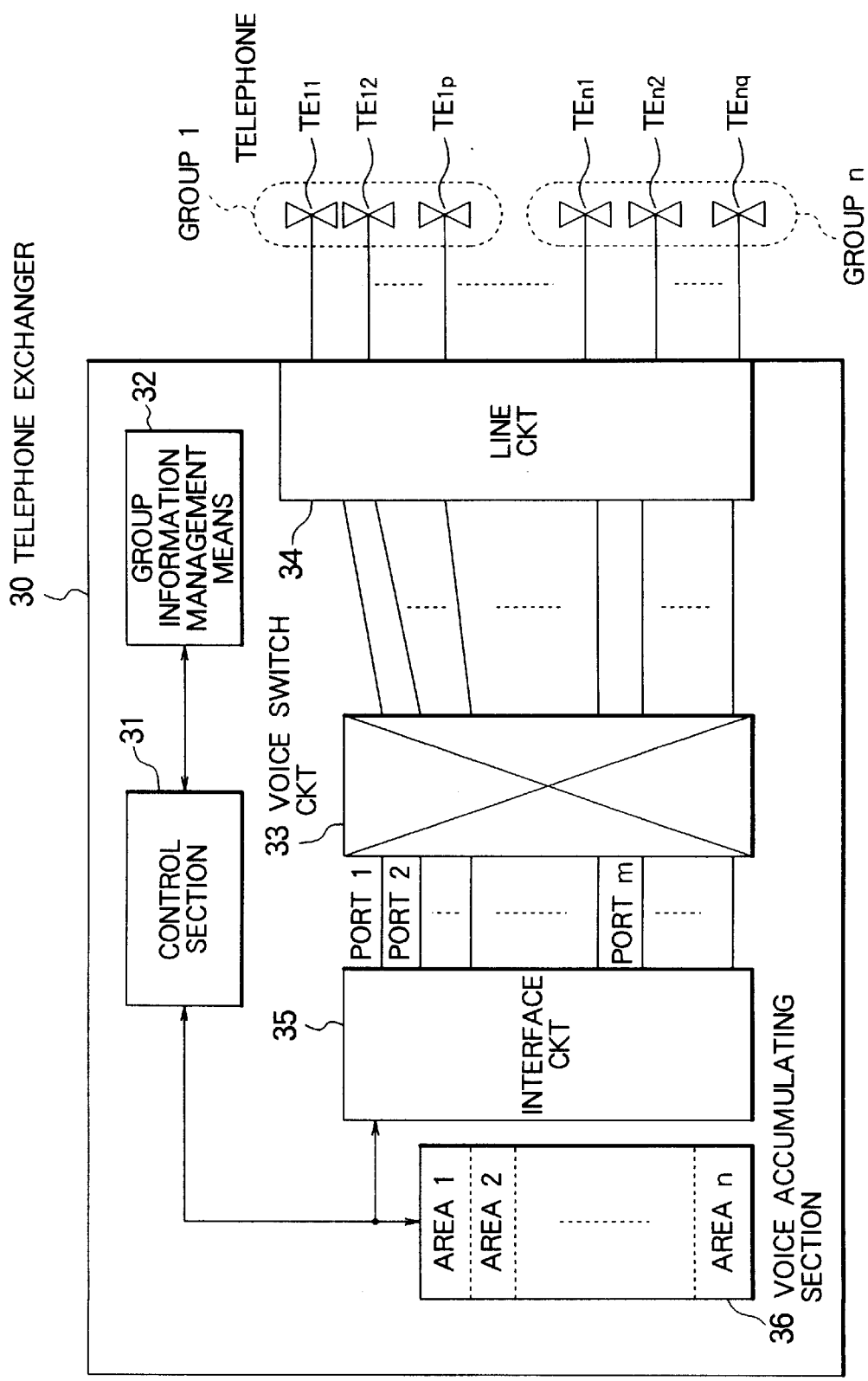
FIG. 3 is a functional block diagram of a voice mail exchange according to a second embodiment of this invention.

Referring to FIG. 3 illustrative of a functional block diagram, the description will further proceed to a voice mail exchange according to a second preferred embodiment of this invention. A voice mail apparatus is integral with a telephone exchanger in this embodiment.

The telephone exchanger 30 comprises a control section 31 controlling the telephone exchanger 30 wholly, a group information management means 32 for telephone groups 1–n for managing telephone groups 1–n of plural telephones, a voice switch circuit 33 between the plural telephones and voice mail ports under control of the control section 31, a line circuit 34 accommodating the plural telephones, an interface circuit 35 interfacing between the voice switch circuit 33 and a voice accumulating section 36, and the voice accumulating section 36 which is divided into areas 1–n in correspondence to the telephone groups 1–n. The plural telephones are internal or house telephone sets and are divided into n groups. Telephones TE11–TE1p belong to group 1, and telephones TEn1–TEnq belong to group n. Ports 1–m connect between the voice switch circuit 33 and the interface circuit 35 and are predetermined to be used by preselected ones of the telephone group 1–n on a basis of office data of the telephone exchanger 30. In the second embodiment, the office data of the telephone exchanger 30 allocate the ports 1, 2 of the interface circuit 35 to the telephone group 1, and the port m of the interface circuit 35 to the telephone group n.

Next, the description will be directed to actual operation of the voice mail exchange according to the second embodiment of this invention. In brief, the description will proceed in case where the telephone TE11 of the telephone group 1 gets access to the voice accumulating section 36. Information of a dial signal from the telephone TE11 is transmitted to the line circuit 34. The line circuit 34 analyzes the dial signal information and recognizes that the telephone TE11 seeks access to the voice accumulating section 36. The line circuit 34 transmits a signal of demand for connecting to the voice accumulating section 36 from the telephone TE11 to the control section 31. The control section 31 refers to a table in the group information management means 32 of the telephone groups 1–n. The table of the group information management means 32 is stored in a memory circuit which may be, for example, an RAM. The control section 31 recognizes that the telephone TE11 belongs to the telephone group 1. The control section 31 controls the voice switch circuit 33 on a basis of the information of the telephone group 1. In the meantime, the control section 31 always manages states of the ports 1–m of the interface circuit 35. In this case, the control section 31 selects an idle port of the ports 1 and 2 of the interface circuit 35. In case both the ports 1 and 2 of the interface circuit 35 are busy, the control section 31 returns a busy tone to the telephone TE11 through the voice switch circuit 33. Even if both the ports 1 and 2 of the interface circuit 35 are busy and some one of other ports of the interface circuit 35 is idle, the control section 31 returns a busy tone to the telephone TE11. Consequently, access to ports to the voice accumulating section 36 for other telephone groups is protected.

Let us suppose that the port 1 of the interface circuit 35 is idle.

The voice accumulating section 36 accumulates and reproduces a voice file. The voice accumulating section 36 is beforehand divided into plural areas in correspondence to the telephone groups by the office data of the telephone exchanger 30.

The control section 31 accumulates a voice from the telephone TE11 in an idle territory of the area 1 which is assigned to the telephone group 1 in the voice accumulating section 36 by information from the interface circuit 35. Furthermore, the control section 31 reads an accumulated voice file at the area 1, and makes the telephone TE11 reproduce.

It will now be surmised that the control section 31 judges that there is no idle territory in the area 1. In this case, the control section 31 returns an error tone to the telephone TE11 through the voice switch circuit 33 if a voice accumulation is newly demanded from the telephone TE11. Even if there is an idle area in the accumulating area which is designated to other telephone groups in the voice accumulating section 36, access to the idle area is not permitted. The control section 31 returns the error tone to the telephone TE11. Consequently, the voice accumulating areas for the other telephone groups is protected.

The above is described about the telephone TE11 belonging to the telephone group 1 as an example. Needless to say, actual operation of any one of other telephones is similar to the above.

According to this invention, when plural departments use commonly a single telephone exchanger, voice accumulating areas are designated to the departments respectively. Consequently, this invention can always ensure a predetermined recording time for each department regardless of frequency of use by other departments.

The reason is the following. The inside of the memory of the voice accumulating section is beforehand divided into plural territories dependent on the departments. Even if there is an idle area in the voice accumulating areas which are assigned to other departments, this invention has a procedure for refusing access to the voice mail apparatus to accumulate messages if the voice accumulating areas which are allocated to the department under consideration are full.

Further, according to this invention, when plural departments use commonly a single telephone exchanger, voice mail ports are preliminarily specified according to the departments. Consequently, this invention can always ensure a predetermined at least one voice mail port for use by each department regardless of frequency of use by other departments.

The reason is the following. Voice mail ports are beforehand specified according to departments. Even if there is an idle port in the voice mail ports which are designated to other departments, this invention has a procedure of refusal of access to the voice mail apparatus provided that busy is at least one of the voice mail ports that is specified to the department in question.

While this invention has thus far been described in specific conjunction with only two preferred embodiments thereof, it will now be readily possible for one skilled in the art to put this invention into practice in various other manners.

Above all, it is possible to decide the office data according to various circumstances. It may appear that the first predetermined number N is greater than the second predetermined number M. The first predetermined number may, however, be less than the second predetermined number. For example, an m(a)-th transmission or message port of first through M-th ports can be used by at least two of first through N-th telephone group. First through N-th memory sectors or areas of the voice accumulating section or message recorder 18 or 36 need not have a common memory area or capacity. Areas or memory capacities of the memory sectors should be decided in consideration of frequencies of access by the telephone groups. Together with the office data, the memory capacities are flexibly decided and can be varied during use of the voice mail exchange. The n-th plurality may be only one although so called in the consistory clause if a housephone or voice mail telephone set of this particular group is very frequently used in the voice mail service.

In addition, the voice mail exchange may be a private branch exchange or a like exchange. In this event, external telephone sets of a public or similar telephone network should be regarded to be in at least one additional group. The line circuit 14 or 34 may be connected to such external telephone sets through trunks (not shown) in the manner known in the art. The voice switching circuit 13 or 33 should in this case be a more conventional exchange unit or switchboard.

What is claimed is:

1. A voice mail exchange for a plurality of voice mail telephone sets grouped into first through N-th groups, in which N represents a predetermined number, an n-th group of said first through said N-th groups comprising an n-th group of telephone sets from among said voice mail telephone sets, where n represents one of 1 to N, both inclusive, said voice mail exchange comprising a message recorder for recording messages and switching means for switching transmission of said messages between said message recorder and the telephone sets of said first through said N-th groups, wherein:

said message recorder comprises first through N-th memory sectors in one-to-one correspondence to said first through said N-th groups so that only an n-th memory sector of said first through said N-th memory sectors is used for the messages originating at and destined for said n-th group of telephone sets:

said switching means judging, when said n-th memory sector should be used for storage of one of said messages that is for said n-th group of telephone sets of said n-th group, whether or not said n-th memory sector includes an idle portion for storage of said one of said messages, said predetermined number being a first predetermined number, wherein said switching means comprises:

first through M-th transmission ports put in a port busy state of transmitting said messages to and from said first through said N-th memory sectors, where M represents a second predetermined number related to said first predetermined number in accordance with predetermined office data;

control means for producing a switching signal in accordance with said office data and for producing control signals in accordance with said office data and in compliance with port state information and recorder state information indicative of whether or not said first through said M-th transmission ports are in said port busy state and whether or not said first through said N-th memory sectors individually include said idle portion, said control signal selectively putting said first through said M-th transmission ports in said port busy state; and switchboard means responsive to said switching signal and said control signals for switching between said first through said N-th memory sectors and the telephone sets of said first through said N-th groups through said first through said M-th transmission ports.

2. A voice mail exchange as claimed in claim 1, wherein said control means produces said switching signal and said control signals in response to a call originating from at least one of said voice mail telephone sets to make said switchboard and one of said first through said M-th transmission ports establish a connection between said one of telephone sets and said n-th memory sector.

3. A voice mail exchange as claimed in claim 2, wherein at least one of said first through M-th transmission ports is assigned to said n-th group of telephone sets, said at least one of said first through M-th transmission ports sending a port busy tone back to said n-th group of telephone sets when one telephone set of said n-th group of telephone sets attempts to access said message recorder while all of said first through M-th transmission ports is busy regardless of whether or not others of said first through said M-th transmission ports are in said port busy state.

4. A voice mail exchange as claimed in claim 2, wherein said control means sends a recorder busy tone back to said at least one of said voice mail telephone sets when no idle portion is included in said n-th memory sector regardless of whether or not an idle portion is included in others of said first through said N-th memory sectors.

5. A voice mail exchange as claimed in claim 2, wherein said control means makes said n-th memory sector store in said idle portion as a stored message one of said messages that follows said call.

6. A voice mail exchange as claimed in claim 5, wherein said control means makes said n-th memory sector reproduce said stored message as a reproduced message for transmission to said at least one of said voice mail telephone sets following an arrival of a request for transmission of said reproduced message to said at least one of said voice mail telephone sets at said switchboard means.

7. A voice mail exchange as claimed in claim 1, wherein said control means produces said switching signal and said control signals in response to an incoming signal indicative of said at least one of said voice mail telephone sets as a destination telephone set to make said switchboard means and one of said first through said M-th transmission ports establish a connection between said one of telephone sets and said n-th memory sector.

8. A voice mail exchange as claimed in claim 1, wherein said switchboard means comprises:

primary interface circuits connected to said first through said M-th transmission ports, respectively, and selectively put by said control signals in an interface busy state of transmitting first through M-th switchboard signals to and from said first through said M-th transmission ports and of supplying said control means with interface state information indicative, as said port state information, of whether or not said primary interface circuits are in said interface busy state;

secondary interface circuits connected to said first through said M-th transmission ports, respectively, and to said message recorder and selectively activated by said control signals for transmission of first through N-th recorder signals between said first through said N-th memory sectors and said first through said M-th transmission ports; and a switchboard responsive to said switching signal for switching between said first through said M-th switchboard signals and the message originating at and destined to the telephone sets of said first through said N-th groups.

9. A voice mail exchange as claimed in claim 8, wherein said control means comprises:

a group information administrating unit for keeping said office data as stored data;

a first control unit responsive to said stored data for supplying said switching signal to said switchboard and responsive additionally to said interface and said recorder state information for supplying said control signals to said primary interface circuits; and a second control unit responsive to said stored data and said interface state information for supplying said control signals to said secondary interface circuits.

10. A voice mail exchange as claimed in claim 1, wherein said switchboard means comprises:

interface circuits connected to said first through said M-th transmission ports, respectively, and to said message recorder and selectively put by said control signals in an interface busy state of interfacing between first through M-th switchboard signals and first through N-th recorder signals for supply to and reception from said first through said N-th memory sectors, said interface circuits supplying said control means with interface state information indicative, as said port state information, of whether or not said interface circuits are in said interface busy state; and a switchboard connected to said first through said M-th transmission ports and responsive to said switching signal for switching between said first through said M-th switchboard signals and the message originating at and destined to the telephone sets of said first through said N-th groups.

11. A voice mail exchange as claimed in claim 10, wherein said control means comprises:

a group information administrating unit for keeping said office data as stored data; and a control unit responsive to said stored data for supplying said switching signal to said switchboard and responsive additionally to said interface and said recorder state information for supplying said control signals to said interface circuits.

* * * * *